US008587577B2

(12) United States Patent
Han et al.

(10) Patent No.: US 8,587,577 B2
(45) Date of Patent: Nov. 19, 2013

(54) SIGNAL TRANSMISSION LINES FOR IMAGE DISPLAY DEVICE AND METHOD FOR WIRING THE SAME

(75) Inventors: In-Hyo Han, Ulsan (KR); Sang-Myung Ha, Seoul (KR)

(73) Assignee: LG Display Co., Ltd., Seoul (KR)

( * ) Notice: Subject to any disclaimer, the term of this patent is extended or adjusted under 35 U.S.C. 154(b) by 554 days.

(21) Appl. No.: 12/856,038

(22) Filed: Aug. 13, 2010

(65) Prior Publication Data

US 2011/0043508 A1 Feb. 24, 2011

(30) Foreign Application Priority Data

Aug. 20, 2009 (KR) ........................ 10-2009-0077193

(51) Int. Cl.
*G06F 3/038* (2013.01)
*G09G 5/00* (2006.01)
*G09G 5/10* (2006.01)

(52) U.S. Cl.
USPC ........................................... 345/211; 345/690

(58) Field of Classification Search
USPC .......... 341/50–107; 345/204–215; 377/64–81
See application file for complete search history.

(56) References Cited

U.S. PATENT DOCUMENTS

| | | | | |
|---|---|---|---|---|
| 6,839,057 | B2 * | 1/2005 | Iguchi | 345/204 |
| 2007/0131936 | A1 * | 6/2007 | Kang et al. | 257/72 |
| 2008/0204615 | A1 * | 8/2008 | Shin et al. | 349/38 |

FOREIGN PATENT DOCUMENTS

| | | | | |
|---|---|---|---|---|
| JP | 2008-064811 | A | | 3/2008 |
| KR | 1020050089441 | A | * | 8/2005 |
| KR | 1020070073020 | A | * | 7/2007 |

OTHER PUBLICATIONS

KIPO—Office Action for Korean Patent Application No. 10-2009-0077193—Issued on May 29, 2013.

* cited by examiner

*Primary Examiner* — Ariel Balaoing
*Assistant Examiner* — Larry Sternbane
(74) *Attorney, Agent, or Firm* — Morgan, Lewis & Bockius LLP

(57) ABSTRACT

Disclosed herein are signal transmission lines for an image display device and a method for wiring the same. The signal transmission lines include a plurality of control signal supply lines formed in a display panel in which at least one driving circuit is formed integrally with an image display region, such that the control signal supply lines are supplied with control signals for control of the driving circuit, respectively, and a plurality of control signal transmission lines formed in the display panel to cross the control signal supply lines and each electrically connected with at least one of the control signal supply lines, so as to transmit a corresponding one of the control signals to the driving circuit, wherein the control signal transmission lines have the same overlap areas with the control signal supply lines when they cross the control signal supply lines.

6 Claims, 5 Drawing Sheets

SIGNAL TRANSMISSION LINES FOR IMAGE DISPLAY DEVICE AND METHOD FOR WIRING THE SAME

This application claims the benefit of the Korean Patent Application No. 10-2009-0077193, filed on Aug. 20, 2009, which is hereby incorporated by reference as if fully set forth herein.

BACKGROUND OF THE INVENTION

1. Field of the Invention

The present invention relates to an image display device, and more particularly, to signal transmission lines for an image display device and a method for wiring the same that can minimize a resistor capacitor (RC) delay deviation resulting from overlaps of the signal transmission lines to improve display quality of an image.

2. Discussion of the Related Art

Recently, light, thin flat panel displays have become the primary image display devices for monitors of personal computers, mobile terminals and various information devices. A liquid crystal display, a light emitting display, a plasma display panel, a field emission display, and the like have been proposed as such flat panel displays.

A typical flat panel display includes a display panel having a plurality of pixels arranged in matrix form for displaying an image, a plurality of driving circuits for driving the display panel, and a control circuit for controlling the respective driving circuits. Here, each driving circuit may include at least one of a gate driver and a data driver, and the control circuit may include a timing controller.

The control circuit or driving circuits configured as mentioned above receive various synchronous signals and control signals from an external system, such as a video card, to drive the display panel. In particular, the control circuit, such as the timing controller, generates a plurality of control signals for control of the respective driving circuits in response to the synchronous signals received from the external system, and the respective driving circuits drive the respective pixels of the display panel in response to the control signals generated by the control circuit.

However, recently, a part of the constituent elements of the aforementioned driving circuits, for example, the gate driver, etc. have been formed in a Gate In Panel (GIP) scheme in which they are formed integrally with the display panel, causing a problem such as distortion of the control signals supplied to the respective driving circuits.

In detail, in a conventional case where the respective driving circuits are formed separately from the display panel, output buffers are provided respectively in the control circuit and driving circuits to maintain output characteristics thereof. However, in the case of the GIP scheme, a separate output buffer cannot be provided in each driving circuit or has little effect even though provided, thereby causing the respective control signals to generate resistor capacitor (RC) delay deviations under the influence of resistors and capacitors formed on supply lines or transmission lines thereof. In particular, overlap areas between a plurality of supply lines supplied with the control signals from the control circuit and a plurality of transmission lines for transmission of the control signals from the respective supply lines to the driving circuits are different, thereby causing the RC delay deviations to increase, thus degrading display quality of an image.

SUMMARY OF THE INVENTION

Accordingly, the present invention is directed to signal transmission lines for an image display device and a method for wiring the same that substantially obviate one or more problems due to limitations and disadvantages of the related art.

An object of the present invention is to provide signal transmission lines for an image display device and a method for wiring the same that can minimize an RC delay deviation resulting from overlaps of the signal transmission lines to improve display quality of an image.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, signal transmission lines for an image display device include a plurality of control signal supply lines formed in a display panel in which at least one driving circuit is formed integrally with an image display region, such that the control signal supply lines are supplied with control signals for control of the driving circuit, respectively, and a plurality of control signal transmission lines formed in the display panel to cross the control signal supply lines and each electrically connected with at least one of the control signal supply lines, so as to transmit a corresponding one of the control signals to the driving circuit, wherein the control signal transmission lines have the same overlap areas with the control signal supply lines when they cross the control signal supply lines.

The control signal transmission lines may have the same extending lengths to be electrically connected with the control signal supply lines, whereby parasitic capacitors having the same capacitances may be formed between the control signal supply lines and the control signal transmission lines when the control signal transmission lines cross and overlap the control signal supply lines.

The signal transmission lines may further include a plurality of power signal supply lines formed in the display panel such that they are externally supplied with first and second power signals, respectively, and a plurality of power signal transmission lines formed in the display panel to cross the power signal supply lines and each electrically connected with at least one of the power signal supply lines, so as to transmit the first or second power signal to the driving circuit or image display region, wherein the power signal transmission lines have the same overlap areas with the power signal supply lines when they cross the power signal supply lines.

The power signal transmission lines may have the same extending lengths to be electrically connected with the power signal supply lines, whereby parasitic capacitors having the same capacitances may be formed between the power signal supply lines and the power signal transmission lines when the power signal transmission lines cross and overlap the power signal supply lines.

The power signal transmission lines may cross and overlap the control signal supply lines, besides the power signal supply lines, and have the same overlap areas with the control signal supply lines when they cross the control signal supply lines, whereby parasitic capacitors having the same capacitances may be formed between the power signal transmission lines and the control signal supply lines when the power signal transmission lines cross and overlap the control signal supply lines.

In another aspect of the present invention, a method for wiring signal transmission lines for an image display device includes forming a plurality of control signal supply lines in a display panel in which at least one driving circuit is formed integrally with an image display region, such that the control signal supply lines are supplied with control signals for control of the driving circuit, respectively, and forming a plurality of control signal transmission lines in the display panel such that they are each electrically connected with at least one of the control signal supply lines, so as to transmit a corresponding one of the control signals to the driving circuit, wherein the step of forming the control signal transmission lines includes forming the control signal transmission lines such that they cross the control signal supply lines, whereby the control signal transmission lines have the same overlap areas with the control signal supply lines when they cross the control signal supply lines.

The step of forming the control signal transmission lines may include forming the control signal transmission lines such that they have the same extending lengths to be electrically connected with the control signal supply lines, whereby parasitic capacitors having the same capacitances are formed between the control signal supply lines and the control signal transmission lines when the control signal transmission lines cross and overlap the control signal supply lines.

The method may further include forming a plurality of power signal supply lines in the display panel such that they are externally supplied with first and second power signals, respectively, and forming a plurality of power signal transmission lines in the display panel such that they cross the power signal supply lines and are each electrically connected with at least one of the power signal supply lines, so as to transmit the first or second power signal to the driving circuit or image display region, wherein the step of forming the power signal transmission lines includes forming the power signal transmission lines such that they have the same overlap areas with the power signal supply lines when they cross the power signal supply lines.

The step of forming the power signal transmission lines may include forming the power signal transmission lines such that they have the same extending lengths to be electrically connected with the power signal supply lines, whereby parasitic capacitors having the same capacitances are formed between the power signal supply lines and the power signal transmission lines when the power signal transmission lines cross and overlap the power signal supply lines.

The step of forming the power signal transmission lines may include forming the power signal transmission lines such that they cross and overlap the control signal supply lines, besides the power signal supply lines, and have the same overlap areas with the control signal supply lines when they cross the control signal supply lines, whereby parasitic capacitors having the same capacitances are formed between the power signal transmission lines and the control signal supply lines when the power signal transmission lines cross and overlap the control signal supply lines.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
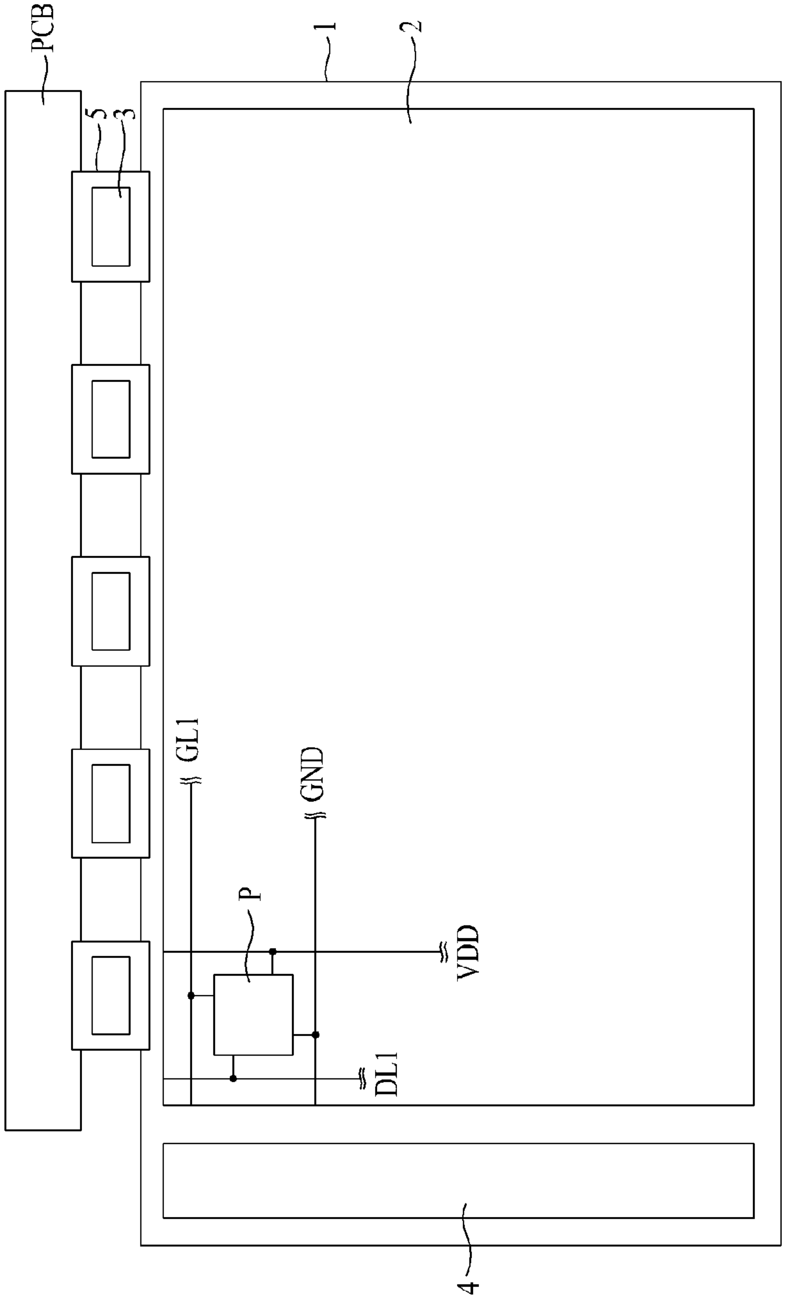
FIG. 1 is a schematic view of an image display device according to an embodiment of the present invention.

FIG. 1 is a schematic view of an image display device according to an embodiment of the present invention.

The image display device shown in FIG. 1 includes a display panel 1 having an image display region 2 in which a plurality of sub-pixels P are arranged, and a gate driver 4 for driving gate lines GL of the image display region 2. In the display panel 1, the image display region 2 and the gate driver 4 are formed integrally with each other. The image display device further includes a plurality of circuit films 5 equipped respectively with a plurality of data drivers 3 for driving data lines DL of the image display region 2, and a printed circuit board (PCB) to which the circuit films 5 are connected.

The image display device of the present invention configured in this manner may be any type of flat panel display, for example, any one of a liquid crystal display, a light emitting display, a plasma display panel and a field emission display. Hereinafter, a description will be given on the assumption that the image display device of the present invention is a light emitting display that most sensitively reacts to output characteristics of control signals supplied to the gate driver 4 as it is formed in a Gate In Panel (GIP) scheme.

The light emitting display of the present invention configured as in FIG. 1 further includes, although not shown, a power supply for applying first and second power signals VDD and GND to power lines of the image display region 2, and a timing controller for arranging external input video data suitably for the size and resolution of the image display region 2 and supplying the arranged video data to each data driver 3, and generating data and gate control signals to control the data and gate drivers 3 and 4.

Figure 2:
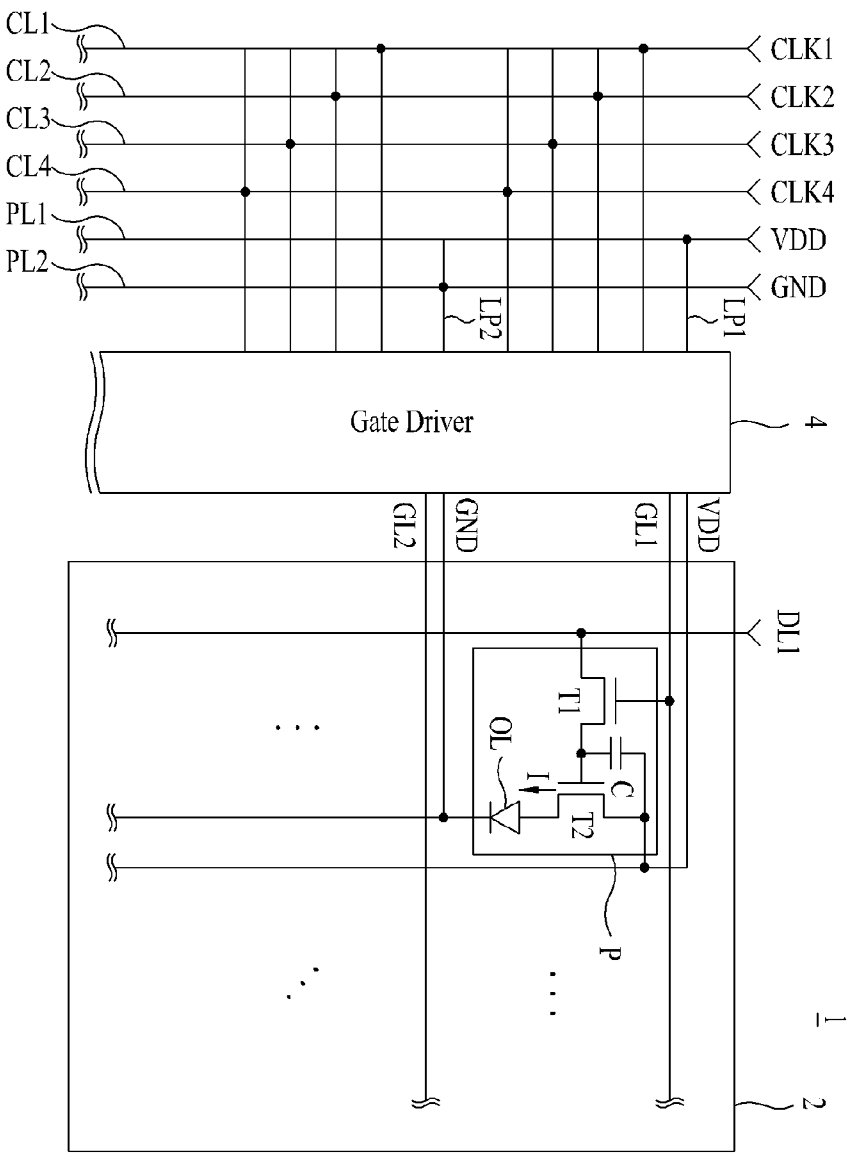
FIG. 2 is a detailed circuit diagram of a plurality of control signal supply lines and transmission lines and an image display region formed in a display panel of FIG. 1.

FIG. 2 is a detailed circuit diagram of a plurality of control signal supply lines and transmission lines and an image display region formed in the display panel of FIG. 1.

As shown in FIG. 1 and FIG. 2, in the image display region 2, a plurality of sub-pixels P are arranged in matrix form to display an image. Here, each sub-pixel P includes a light emitting cell OL, a first switching element T1 connected to any one gate line GL1 and any one data line DL1, a second switching element T2 connected among the first switching element T1, a first power signal VDD transmission line LP1 and the light emitting cell OL, and a storage capacitor C connected between the first power signal VDD transmission line LP1 and the first switching element T1. The light emitting cell OL is connected between the second switching element T2 and a second power signal GND transmission line LP2 and is equivalently expressed as a diode.

The first switching element T1 has a gate electrode connected to the gate line GL1, a source electrode connected to the data line DL1, and a drain electrode connected to the gate electrode of the second switching element T2. When a gate on signal is supplied to the gate line GL1, the first switching element T1 is turned on, so as to supply a data signal supplied to the data line DL1 to the storage capacitor C and the gate electrode of the second switching element T2.

The second switching element T2 has a source electrode connected to the first power signal VDD transmission line LP1, and a drain electrode connected to the light emitting cell OL. This second switching element T2 controls the amount of current I to be supplied from the first power signal VDD transmission line LP1 to the light emitting cell OL in response to the data signal from the first switching element T1, so as to control the amount of light to be emitted from the light emitting cell OL.

The storage capacitor C is connected between the first power signal VDD transmission line LP1 and the gate electrode of the second switching element T2. Even though the first switching element T1 is turned off, the second switching element T2 is kept on by a voltage charged on the storage capacitor C, so as to maintain the light emission of the light emitting cell OL until a data signal of a next frame is supplied. Here, although either PMOS or NMOS transistors may be used as the first and second switching elements T1 and T2, only the case where NMOS transistors are used as the first and second switching elements T1 and T2 has been described above.

The gate driver 4 sequentially generates gate on signals in response to gate control signals, for example, a gate start pulse (GSP) and a gate shift clock (GSC), from the timing controller and controls the pulse widths of the gate on signals in response to a gate output enable (GOE) signal from the timing controller. Then, the gate driver 4 sequentially supplies the gate on signals to the gate lines GL. Here, a gate off voltage is supplied to the gate lines GL in a period in which a gate on voltage is not supplied to the gate lines GL. This gate driver 4 is formed in the display panel 1 integrally with each sub-pixel P in the aforementioned GIP scheme.

Each of the data drivers 3 includes a data driving integrated circuit (IC), which converts video data inputted from the timing controller into analog voltages, or analog video signals, using a source start pulse (SSP) and a source shift clock (SSC) among data control signals from the timing controller. Then, each data driving IC supplies the video signals to the respective data lines DL in response to a source output enable (SOE) signal from the timing controller. In detail, each data driving IC latches input video data based on the SSC and then supplies video signals of one horizontal line to the respective data lines DL in every one horizontal period in which a scan pulse is supplied to each gate line GL, in response to the SOE signal.

On the other hand, the timing controller, not shown, arranges external input video data suitably for the size and resolution of the image display region 2 and supplies the arranged video data to each data driver 3. Also, the timing controller generates the gate and data control signals using synchronous signals, for example, MCLK, DE, Hsync and Vsync signals, externally inputted thereto and supplies them to the gate and data drivers 4 and 3, respectively.

Further, the image display device of the present invention includes the power supply, not shown, which supplies the first power signal VDD and the second power signal GND to the display panel 1 and the gate and data drivers 4 and 3. Here, the first power signal VDD means a driving voltage for driving the light emitting cell OL, and the second power signal GND means a ground voltage or low voltage. Current corresponding to a video signal flows to each sub-pixel P based on a voltage difference between the first power signal VDD and the second power signal GND.

A plurality of control signal supply lines CL1 to CL4 shown in FIG. 2 may serve as supply lines for a plurality of clock pulses CLK1 to CLK4 constituting at least one of the aforementioned gate control signals, for example, the GSC, GSP and GOE signal. Also, a plurality of control signal transmission lines LC1 to LC4 may serve as lines for transmitting the respective clock pulses CLK1 to CLK4 supplied to the respective control signal supply lines CL1 to CL4 to the gate driver 4. The control signal supply lines CL1 to CL4 and the control signal transmission lines LC1 to LC4 will hereinafter be described in more detail with reference to the annexed drawings.

Figure 3:
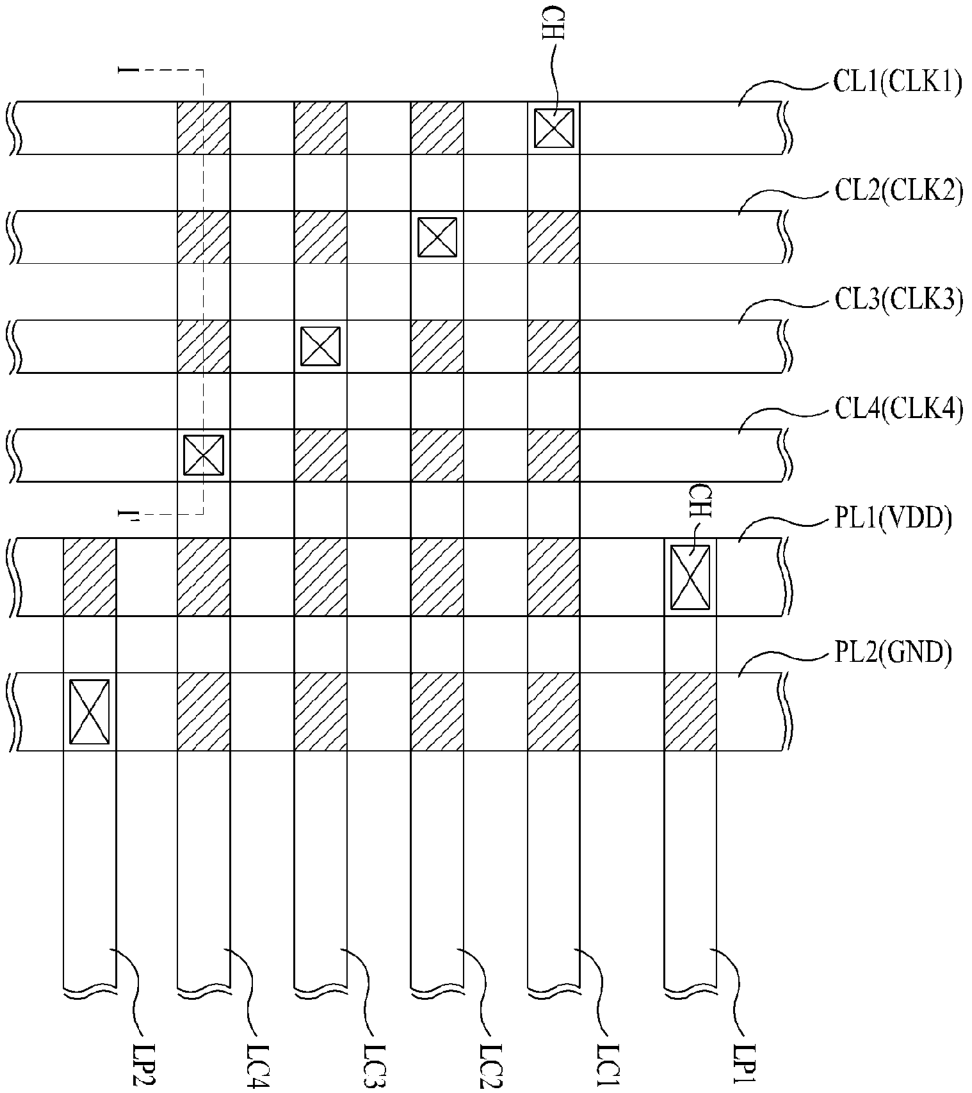
FIG. 3 is a detailed diagram of the control signal supply lines and transmission lines shown in FIG. 2.

FIG. 3 is a detailed diagram of the control signal supply lines and transmission lines shown in FIG. 2.

As shown in FIG. 2 and FIG. 3, the control signal supply lines CL1 to CL4 and the control signal transmission lines LC1 to LC4 are provided in the display panel 1 of the present invention in which the gate driver 4 and the image display region 2 are formed integrally with each other. The control signal supply lines CL1 to CL4 are supplied respectively with a plurality of gate control signals for control of the gate driver 4. The control signal transmission lines LC1 to LC4 are formed to cross the control signal supply lines CL1 to CL4 and are each electrically connected with at least one of the control signal supply lines CL1 to CL4, so as to transmit the corresponding gate control signal to the gate driver 4. Here, the control signal transmission lines LC1 to LC4 have the same overlap areas with the control signal supply lines CL1 to CL4 when they cross the control signal supply lines CL1 to CL4.

In detail, the control signal transmission lines LC1 to LC4 have the same extending lengths to be electrically connected with the control signal supply lines CL1 to CL4, so that parasitic capacitors having the same capacitances are also formed between the control signal supply lines CL1 to CL4 and the control signal transmission lines LC1 to LC4 when the control signal transmission lines LC1 to LC4 cross and overlap the control signal supply lines CL1 to CL4. In FIG. 3, cross regions indicated by oblique lines represent respective overlap regions between the control signal supply lines CL1 to CL4 and the control signal transmission lines LC1 to LC4. In this manner, although the control signal transmission lines LC1 to LC4 are electrically connected with the control signal supply lines CL1 to CL4 at different positions, respective overlap areas between the control signal supply lines CL1 to CL4 and the control signal transmission lines LC1 to LC4 are the same.

Figure 4:
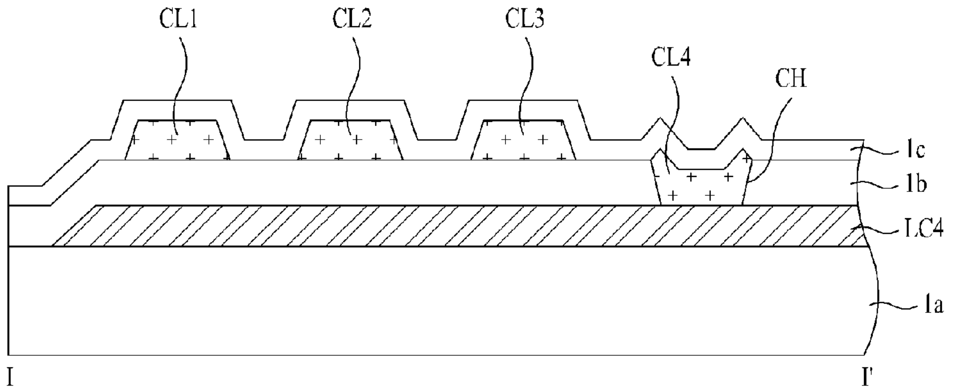
FIG. 4 is a cross-sectional view cut along a line I-I' shown in FIG. 3.

FIG. 4 is a cross-sectional view cut along a line I-I' shown in FIG. 3.

As shown in FIG. 4, the control signal transmission lines LC1 to LC4 may be formed by a gate electrode forming material on any one substrate of the display panel 1, for example, a lower substrate 1*a* of the display panel 1.

When the control signal transmission lines LC1 to LC4 are patterned on the same layer as that of the gate lines of the image display region 2 by the same material as that of the gate lines, a gate insulating film 1*b* is further formed by a certain insulating material on the lower substrate 1*a* on which the control signal transmission lines LC1 to LC4 are formed.

Then, in the gate insulating film 1*b*, contact holes CH are formed at respective connection positions between the control signal supply lines CL1 to CL4 and the control signal transmission lines LC1 to LC4, so that the respective control signal supply lines CL1 to CL4 to be subsequently formed are electrically connected with the respective control signal transmission lines LC1 to LC4 through the corresponding contact holes CH.

Then, a protection film 1*c* may be further formed by a certain insulating material on the lower substrate 1*a* on which the control signal transmission lines LC1 to LC4 are formed.

As shown in FIG. 4, although the control signal supply lines CL1 to CL4 are electrically connected with the control signal transmission lines LC1 to LC4 in respective regions in which the contact holes CH are formed, parasitic capacitors are formed in portions in which the control signal supply lines CL1 to CL4 and the control signal transmission lines LC1 to LC4 overlap each other via the insulating film 1*b*. However, in the present invention, because the overlap areas between the control signal supply lines CL1 to CL4 and the control signal transmission lines LC1 to LC4 are the same as shown in FIG. 3, the parasitic capacitors therebetween also have the same capacitances. As a result, it is possible to minimize an RC delay deviation on each of the control signal supply lines CL1 to CL4 and the control signal transmission lines LC1 to LC4.

On the other hand, a plurality of power signal supply lines PL1 and PL2 and a plurality of power signal transmission lines LP1 and LP2 are provided in the display panel 1 in which the control signal supply lines CL1 to CL4 and the control signal transmission lines LC1 to LC4 are formed together with the image display region 2. The power signal supply lines PL1 and PL2 are supplied with the first and second power signals VDD and GND, respectively. The power signal transmission lines LP1 and LP2 are formed to cross the power signal supply lines PL1 and PL2 and are each electrically connected with at least one of the power signal supply lines PL1 and PL2, so as to transmit the corresponding first or second power signal VDD or GND to the gate driver 4 or image display region 2. Here, the power signal transmission lines LP1 and LP2 have the same overlap areas with the power signal supply lines PL1 and PL2 when they cross the power signal supply lines PL1 and PL2.

In detail, the power signal transmission lines LP1 and LP2 have the same extending lengths to be electrically connected with the power signal supply lines PL1 and PL2, so that parasitic capacitors having the same capacitances are also formed between the power signal supply lines PL1 and PL2 and the power signal transmission lines LP1 and LP2 when the power signal transmission lines LP1 and LP2 cross and overlap the power signal supply lines PL1 and PL2. In this manner, although the power signal transmission lines LP1 and LP2 are electrically connected with the power signal supply lines PL1 and PL2 at different positions, respective overlap areas between the power signal supply lines PL1 and PL2 and the power signal transmission lines LP1 and LP2 are the same.

On the other hand, the power signal transmission lines LP1 and LP2 may further cross and overlap the control signal supply lines CL1 to CL4, besides the power signal supply lines PL1 and PL2. However, even in this case, the power signal transmission lines LP1 and LP2 have the same overlap areas with the control signal supply lines CL1 to CL4 when they cross the control signal supply lines CL1 to CL4. As a result, parasitic capacitors having the same capacitances are also formed between the power signal transmission lines LP1 and LP2 and the control signal supply lines CL1 to CL4 when the power signal transmission lines LP1 and LP2 cross and overlap the control signal supply lines CL1 to CL4.

Figure 5:
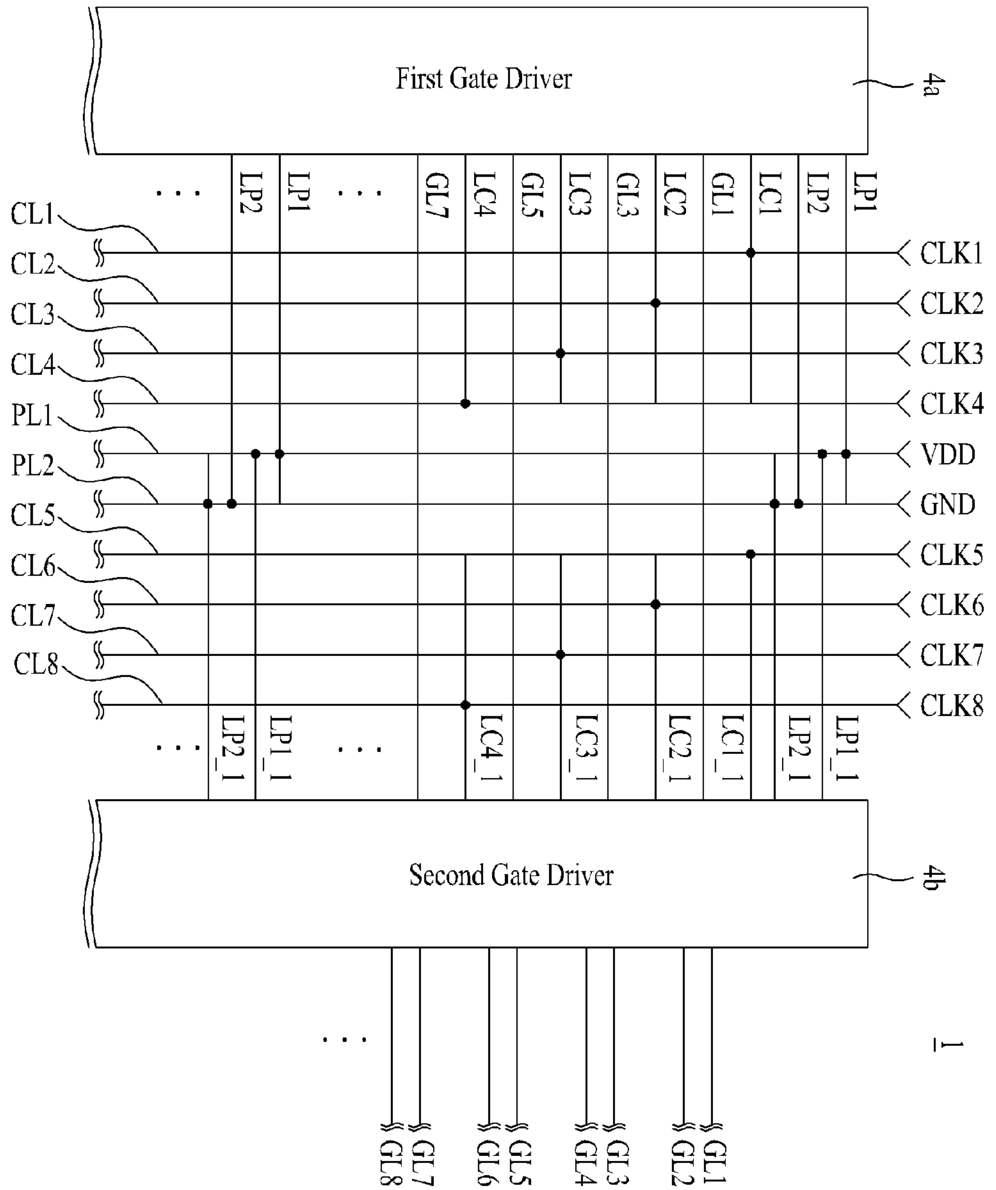
FIG. 5 is another circuit diagram showing a plurality of control signal supply lines and transmission lines and a plurality of gate drivers formed in the display panel of FIG. 1.

FIG. 5 is another circuit diagram showing a plurality of control signal supply lines and transmission lines and a plurality of gate drivers formed in the display panel of FIG. 1.

As shown in FIG. 5, a plurality of driving circuits, namely, a plurality of gate drivers 4*a* and 4*b* may be formed in the display panel 1 of the present invention. These gate drivers 4*a* and 4*b* may separately drive a plurality of gate lines GL1 to GL8 formed in the image display region 2.

For example, the first gate driver 4*a* sequentially drives odd ones GL1, GL3, GL5, . . . of all the gate lines GL1 to GL8, and the second gate driver 4*b* sequentially drives even ones GL2, GL4, GL6, . . . of all the gate lines GL1 to GL8 alternately with the odd gate lines GL1, GL3, GL5, . . . , . In order to separately, alternately, and sequentially drive all the gate lines GL1 to GL8 as stated above, the gate drivers 4*a* and 4*b* have to receive a plurality of different gate control signals.

To this end, formed in the display panel 1 of the present invention are a plurality of first control signal supply lines CL1 to CL4 supplied with a plurality of first gate control signals to be supplied to the first gate driver 4*a*, a plurality of first control signal transmission lines LC1 to LC4 for transmitting the first gate control signals supplied to the first control signal supply lines CL1 to CL4 to the first gate driver 4*a*, a plurality of second control signal supply lines CL5 to CL8 supplied with a plurality of second gate control signals to be supplied to the second gate driver 4*b*, and a plurality of second control signal transmission lines LC1_1 to LC4_1 for transmitting the second gate control signals supplied to the second control signal supply lines CL5 to CL8 to the second gate driver 4*b*.

Here, the first control signal transmission lines LC1 to LC4 have the same extending lengths to be electrically connected with the first control signal supply lines CL1 to CL4, so that parasitic capacitors having the same capacitances are also formed between the first control signal supply lines CL1 to CL4 and the first control signal transmission lines LC1 to LC4 when the first control signal transmission lines LC1 to LC4 cross and overlap the first control signal supply lines CL1 to CL4. Also, the second control signal transmission lines LC1_1 to LC4_1 have the same extending lengths to be electrically connected with the second control signal supply lines CL5 to CL8, so that parasitic capacitors having the same capacitances are also formed between the second control signal supply lines CL5 to CL8 and the second control signal transmission lines LC1_1 to LC4_1 when the second control signal transmission lines LC1_1 to LC4_1 cross and overlap the second control signal supply lines CL5 to CL8.

On the other hand, a plurality of power signal supply lines PL1 and PL2 and a plurality of first and second power signal transmission lines LP1, LP2, LP1_1 and LP2_1 are provided in the display panel 1 in which the first and second control signal supply lines CL1 to CL8 and the first and second control signal transmission lines LC1 to LC4_1 are formed. The power signal supply lines PL1 and PL2 are supplied with the first and second power signals VDD and GND, respectively. The first and second power signal transmission lines LP1, LP2, LP1_1 and LP2_1 are formed to cross the power signal supply lines PL1 and PL2 and are each electrically connected with at least one of the power signal supply lines PL1 and PL2, so as to transmit the corresponding first or second power signal VDD or GND to the first or second gate driver 4*a* or 4*b*. Here, the first and second power signal transmission lines LP1, LP2, LP1_1 and LP2_1 have the same overlap areas with the power signal supply lines PL1 and PL2 when they cross the power signal supply lines PL1 and PL2.

In detail, the first and second power signal transmission lines LP1, LP2, LP1_1 and LP2_1 have the same extending lengths to be electrically connected with the power signal supply lines PL1 and PL2, so that parasitic capacitors having the same capacitances are also formed between the power signal supply lines PL1 and PL2 and the first and second power signal transmission lines LP1, LP2, LP1_1 and LP2_1 when the first and second power signal transmission lines LP1, LP2, LP1_1 and LP2_1 cross and overlap the power signal supply lines PL1 and PL2.

On the other hand, the first and second power signal transmission lines LP1, LP2, LP1_1 and LP2_1 may further cross and overlap the first or second control signal supply lines CL1 to CL8, besides the power signal supply lines PL1 and PL2. However, even in this case, the first and second power signal transmission lines LP1, LP2, LP1_1 and LP2_1 have the same overlap areas with the first or second control signal supply lines CL1 to CL8 when they cross the control signal supply lines CL1 to CL8. As a result, parasitic capacitors having the same capacitances are also formed between the first and second power signal transmission lines LP1, LP2, LP1_1 and LP2_1 and the control signal supply lines CL1 to CL8 when the first and second power signal transmission lines LP1, LP2, LP1_1 and LP2_1 cross and overlap the control signal supply lines CL1 to CL8.

As described above, in signal transmission lines for an image display device and a method for wiring the same according to an embodiment of the present invention, parasitic capacitors formed due to overlaps of the signal transmission lines, namely, control signal supply lines and control signal transmission lines, have capacitances which are as close to equal as possible. Therefore, it is possible to minimize an RC delay deviation on each of the control signal supply lines and control signal transmission lines. Consequently, the present invention can prevent occurrence of regular/irregular blur resulting from the RC delay deviation, so as to improve display quality of an image.

As apparent from the above description, signal transmission lines for an image display device and a method for wiring the same according to an embodiment of the present invention can minimize an RC delay deviation resulting from overlaps of the signal transmission lines. Therefore, it is possible to prevent occurrence of regular/irregular blur resulting from the RC delay deviation, so as to improve display quality of an image.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. Signal transmission lines for an image display device, comprising:

a plurality of control signal supply lines formed in a display panel in which at least one driving circuit is formed integrally with an image display region, such that the control signal supply lines are supplied with control signals for control of the driving circuit, respectively;

a plurality of control signal transmission lines formed in the display panel to cross the control signal supply lines and each electrically connected with at least one of the control signal supply lines, to transmit a corresponding one of the control signals to the driving circuit;

a plurality of power signal supply lines formed in the display panel such that they are externally supplied with first and second power signals, respectively; and a plurality of power signal transmission lines formed in the display panel to cross the power signal supply lines and each electrically connected with at least one of the power signal supply lines, to transmit the first or second power signal to the driving circuit or image display region, wherein the control signal transmission lines have the same overlap areas with the control signal supply lines when they cross the control signal supply lines, wherein the power signal transmission lines cross and overlap the control signal supply lines, as well as the power signal supply lines, and have the same overlap areas with the control signal supply lines when they cross the control signal supply lines, whereby parasitic capacitors having the same capacitances are formed between the power signal transmission lines and the control signal supply lines when the power signal transmission lines cross and overlap the control signal supply lines.

2. The signal transmission lines according to claim 1, wherein the control signal transmission lines have the same extending lengths to be electrically connected with the control signal supply lines, whereby parasitic capacitors having the same capacitances are formed between the control signal supply lines and the control signal transmission lines when the control signal transmission lines cross and overlap the control signal supply lines.

3. The signal transmission lines according to claim 2, wherein the power signal transmission lines have the same extending lengths to be electrically connected with the power signal supply lines, whereby parasitic capacitors having the same capacitances are formed between the power signal supply lines and the power signal transmission lines when the power signal transmission lines cross and overlap the power signal supply lines.

4. A method for wiring signal transmission lines for an image display device, the method comprising:

forming a plurality of control signal supply lines in a display panel in which at least one driving circuit is formed integrally with an image display region, such that the control signal supply lines are supplied with control signals for control of the driving circuit, respectively;

forming a plurality of control signal transmission lines in the display panel such that they are each electrically connected with at least one of the control signal supply lines, to transmit a corresponding one of the control signals to the driving circuit;

forming a plurality of power signal supply lines in the display panel such that they are externally supplied with first and second power signals, respectively; and forming a plurality of power signal transmission lines in the display panel such that they cross the power signal supply lines and are each electrically connected with at least one of the power signal supply lines, to transmit the first or second power signal to the driving circuit or image display region, wherein the step of forming the control signal transmission lines comprises forming the control signal transmission lines such that they cross the control signal supply lines, whereby the control signal transmission lines have the same overlap areas with the control signal supply lines when they cross the control signal supply lines, wherein the step of forming the power signal transmission lines comprises forming the power signal transmission lines such that they cross and overlap the control signal supply lines, as well as the power signal supply lines, and have the same overlap areas with the control signal supply lines when they cross the control signal supply lines, whereby parasitic capacitors having the same capacitances are formed between the power signal transmission lines and the control signal supply lines when the power signal transmission lines cross and overlap the control signal supply lines.

5. The method according to claim 4, wherein the step of forming the control signal transmission lines comprises forming the control signal transmission lines such that they have the same extending lengths to be electrically connected with the control signal supply lines, whereby parasitic capacitors having the same capacitances are formed between the control signal supply lines and the control signal transmission lines when the control signal transmission lines cross and overlap the control signal supply lines.

6. The method according to claim 5, wherein the step of forming the power signal transmission lines comprises forming the power signal transmission lines such that they have the same extending lengths to be electrically connected with the power signal supply lines, whereby parasitic capacitors having the same capacitances are formed between the power signal supply lines and the power signal transmission lines when the power signal transmission lines cross and overlap the power signal supply lines.

* * * * *